United States Patent
Kaspareck, deceased et al.

[15] 3,693,418
[45] Sept. 26, 1972

[54] ADJUSTABLE FORCE PROBE

[72] Inventors: Walter E. Kaspareck, deceased, late of Huntsville, Ala. by Anni Kaspareck, administratrix; Ben B. Swords, Albertville; Werner K. Rosinski, Huntsville, both of Ala.

[73] Assignee: The United States of America as represented by the Administrator of the National Aeronautics and Space Administration

[22] Filed: Dec. 17, 1970

[21] Appl. No.: 99,174

[52] U.S. Cl. .................................73/85, 73/141 AB
[51] Int. Cl. ................................................G01n 3/42
[58] Field of Search ...............73/85, 81, 141 AB, 88; 287/115

[56] References Cited

UNITED STATES PATENTS

| 1,502,528 | 7/1924 | Reulbach............287/115 UX |
| 2,421,449 | 6/1947 | Zuber..............................73/81 |
| 2,321,770 | 6/1943 | Persson......................73/81 X |

*Primary Examiner*—Jerry W. Myracle
*Attorney*—L. D. Wofford, Jr., W. H. Riggins and John R. Manning

[57] ABSTRACT

A hand operated force probe for applying a preset force against an object to determine if the object is properly secured comprising a plunger engaged by rollers fitting in an annular groove in the plunger. The rollers are held in the groove by longitudinal yieldable springs and the effective length of the springs is adjustable to vary the stiffness of the springs and thus vary the force required to ride the rollers out of the groove. In operation, the end of the plunger is pressed against a surface and when the force applied through the plunger exceeds the preset force, i.e. the force required to ride the rollers out of the groove, the plunger promptly retracts.

9 Claims, 4 Drawing Figures

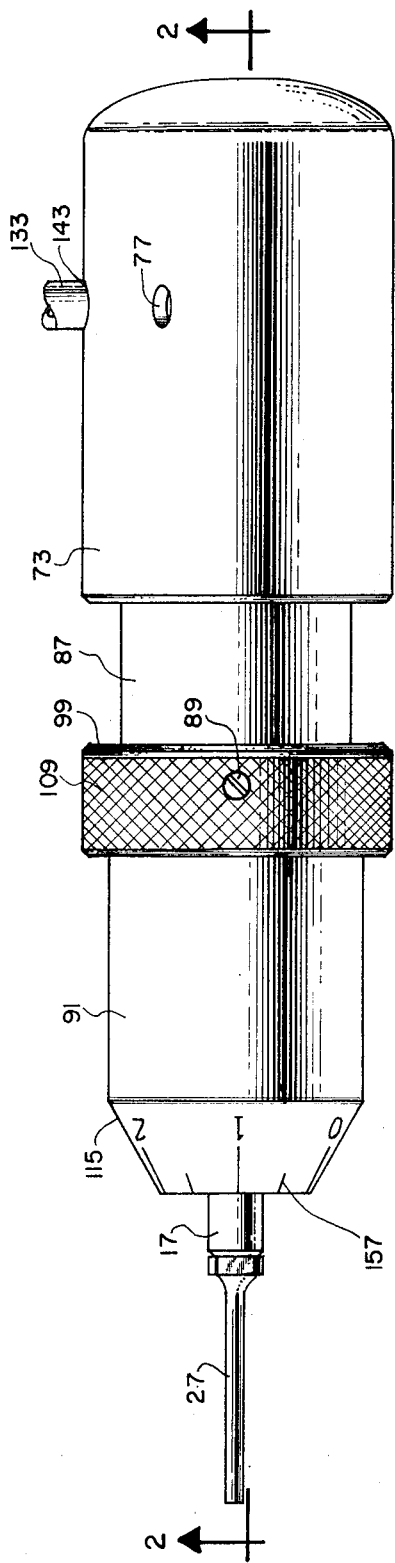
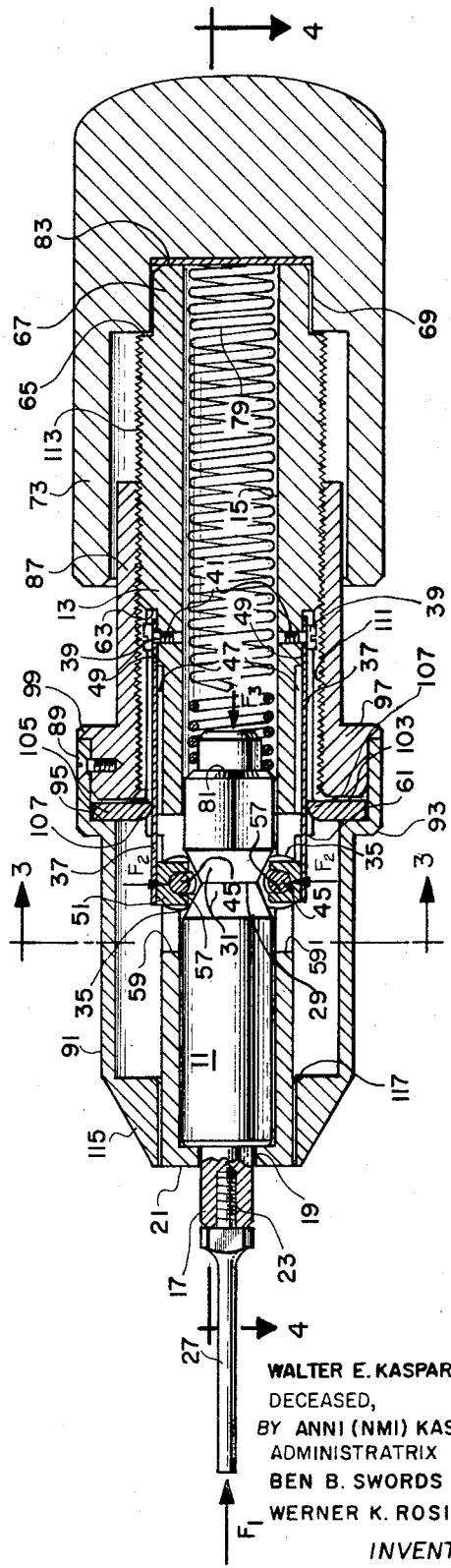

WALTER E. KASPARECK,
DECEASED,
BY ANNI (NMI) KASPARECK,
ADMINISTRATRIX
BEN B. SWORDS
WERNER K. ROSINSKI
INVENTORS

BY Wayland H. Riggins
ATTORNEY

ADJUSTABLE FORCE PROBE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to testing devices and more particularly to a hand operated device for applying an adjustable preset force against an object to test the stability of the object.

In connection with certain testing operations it is desired to apply a specified force against an object. For example, it may be desired to test the hardness of a particular material by pressing a probe against its surface and relating the pressing force to the imprint made in the material. Another example is determining whether certain elements in mechanical or electrical equipment will remain in place when subjected to specified forces. One instance of this kind of testing involves the application of a preset force against the end of an electrical contact pin that is friction fitted in a socket. The purpose of this test is to check whether the fit of the contact pin in the socket is tight enough to keep the pin in place under use conditions. A force probe is inserted in the socket end opposite the end from which the contact pin was inserted so that the probe end contacts the inserted end of the contact pin. A force is then applied against the contact pin through the probe to test whether the contact pin is adequately secured.

In some elaborate electrical systems currently used in aerospace work and other fields, great numbers of tapered contact pins are used in patch distributor boards, and since the pins are tested individually, it is important that the time required for testing a pin be held to a minimum. It is also important that the amount of force applied to the contact pin through the probe equals but does not exceed the force specified for the test. In addition, it is desirable that the test force applied be quickly adjustable and that the testing device be simple to operate.

SUMMARY OF THE INVENTION

The invention comprises a plunger disposed slidably within a sleeve. An indentation is formed in the plunger in which is fitted a detent roller that is held in the indentation by a yieldable element, such as a longitudinal spring. Means is provided for varying the stiffness of the yieldable element to thereby vary the force required to ride the roller out of the indentation when such force is applied longitudinally or axially of the plunger. When this required force is preset by adjusting the stiffness of the yieldable element the free end of the plunger may be pressed against a surface and when the applied force equals the preset force the plunger will promptly retract due to the roller riding out of the identation.

Accordingly, it is a general object of the present invention to provide an improved device for applying a preset force against an element or object.

A more specific object of the invention is to provide a hand-operated probe for applying a precise force against an element to test whether the element is properly secured for use conditions.

Another object of the invention is to provide a relatively simple, economical and foolproof device for quickly applying a preset force against an object wherein the preset force is easily, quickly and accurately adjustable.

Another object of the invention is to provide a means for testing the friction fit of large numbers of electric contact pins without requiring the services of skilled personnel.

These and other objects and advantages of the invention will become apparent upon reference to the following specification, attendant claims and drawing.

BRIEF DESCRIPTION OF THE DRAWING

FIG. 1 is an elevational view of an adjustable force probe embodying the present invention.

FIG. 2 is a cross sectional view taken along line 2—2 of FIG. 1.

DESCRIPTION OF THE PREFERRED EMBODIMENT

Figure 4:
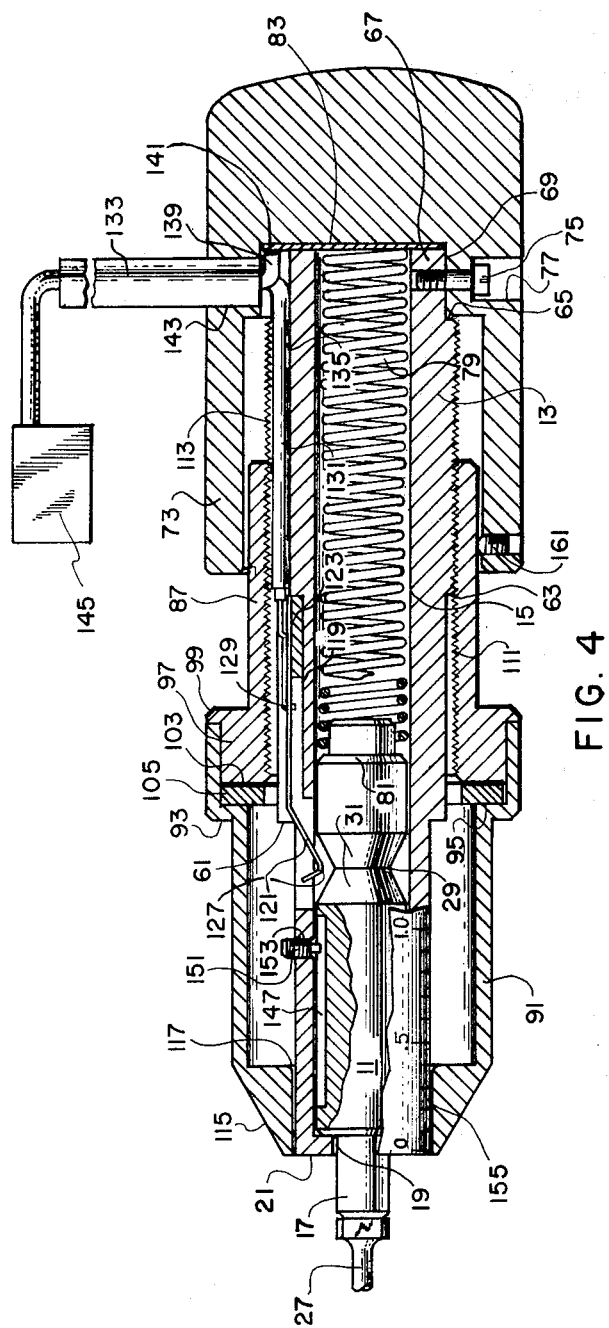
FIG. 4 is a cross sectional view taken along line 4—4 of FIG. 2.

Referring to FIG. 2, the adjustable force probe shown therein comprises a plunger 11 slidably disposed in a sleeve 13 having a longitudinal opening 15 therethrough. The plunger 11 has an end projection 17 of reduced diameter that projects through an opening 19 in the end of the sleeve 13. The end portion of the sleeve 13 around the opening 19 forms a stop 21 limiting the outward motion of the plunger 11 within the sleeve 13. The projection 17 has a threaded socket 23 by which a probe 27 is threadedly connected to the plunger 11. It is apparent that probes of various configurations and designed for various purposes may be quickly connected to the plunger 11.

An annular groove 29 comprising opposite conical surfaces 31 forms an indentation in the main body of the plunger 11. Detent rollers 35 are fitted in the groove 29 with the rollers being flexibly mounted on opposite sides of the plunger 11 by longitudinal metallic springs 37 that are secured near one end by screws 39 engaged in holes 41 in the sleeve 13. The rollers 35 each comprises spaced conical portions 43 (FIG. 3) joined by an integral circular shaft 45. The conical surfaces of the roller portions 43 correspond to the conical surfaces 31 of the groove 29 so that maximum contact will be maintained between the roller surfaces and the groove surfaces.

The springs 37 are positioned in diametrically opposed longitudinal grooves 47 in the sleeve 13 and the grooves are shallowed at the fixed ends of the springs to form seats 49 on which the springs bear. Each of the springs 37 carries a bearing element 51 at an end thereof terminating in the vicinity of the rollers 35. The bearing elements are joined to the springs 37 by rivets 55 and have circular recesses 57 therein that mate with the shafts 45 extending between the conical roller portions 43. The bearing elements 51 fit between the conical portions 43 with the shafts 45 rotatably disposed in the recesses 57.

The rollers 35 and bearing elements 51 project laterally of the sleeve 13 through longitudinal slots 59 provided in the sleeve. The diameter of the sleeve 13 changes at 61 and 63 due to stepped changes in the wall thickness of the sleeve. The diameter of the sleeve decreases at 65 to form an end portion 67 of reduced diameter that fits in a socket 69 of a handle 73. The handle 73 is joined to the sleeve 13 by a plurality of screws 75 (FIG. 4) in countersunk openings 77. A coil compression spring 79 is arranged in the sleeve 13 between the plunger 11 and the handle 73. One end of the spring 79 bears on a seat 81 formed near the inner end of the plunger 11 and the other end of the spring contacts an end plate 83 that contacts the handle 73. The spring 79 urges the plunger 11 toward the extended position shown in the drawing.

Figure 3:
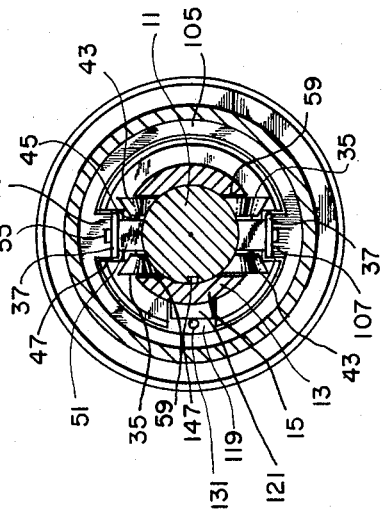
FIG. 3 is a cross sectional view taken along line 3—3 of FIG. 2.

The handle 73 telescopes over a portion of a cylindrical section 87 that is joined by screws 89 (FIG. 2) to a second longitudinal section 91. The joining end of the section 91 is enlarged at 93 forming an internal annular shoulder 95. The enlarged end of the section 91 fits around an enlarged end 97 of the section 87 with the end edge of the section 91 contacting an annular flange 99 of the section 87. Between the annular shoulder 95 of the section 91 and the end of the section 87 a space 103 is provided that retains a ring 105. As shown in FIGS. 2 and 3, the ring 105 has opposite inwardly directed projections 107 that fit in the grooves 47 and contact the longitudinal springs 37. The ring 105 may be moved longitudinally of the grooves 47 by manually rotating the cylindrical sections 87 and 91, such rotation being facilitated by the knurled surface 109 (FIG. 1) formed on the enlarged end portion of the section 91. Rotation of the sections 87 and 91 causes longitudinal movement of these sections, and thus the ring 105, due to internal threads 111 on the section 87 and external threads 113 between the steps 63 and 65 of the sleeve 13. The outer end of the section 91 tapers at 115 and the internal diameter of the section reduces at 117 to provide a supporting portion for the sleeve 13.

Referring to FIG. 4, the portion of the sleeve 13 between the steps 61 and 63 has an additional longitudinal groove 119 therein separated 90° radially from the opposed grooves 47. The groove 119 receives a contact spring 121 that is joined to the sleeve 13 at one end of a shallowed portion 123 and has a free curved end 127 deflected into the annular groove 29 to make and maintain contact with the plunger 11 when the plunger is retracted as will be explained hereinafter in describing the operation of the invention.

The contact spring 121 is soldered at 129 to a conductor section 131 of a coaxial cable 133. The conductor section 131 of the coaxial cable fits in a longitudinal groove 135 of the sleeve 13 and a shielding section 139 of the coaxial cable 133 is soldered at 141 to the plate 83 to provide a ground connection to the force probe. The coaxial cable 133 passes through an opening 143 in the handle 73 and extends to a buzzer and power source 145. The circuit for the buzzer is arranged so that the circuit is completed and the buzzer sounds when the plunger 11, upon retraction, contacts the spring 121.

To prevent the plunger 11 from rotating within the sleeve 13, a longitudinal groove 147 (FIG. 4) is formed in the plunger 11 and a screw 151 fits in a threaded opening 153 in the sleeve 13 and projects into the groove 147.

OPERATION

When the end of the probe 27 is pressed against an object to apply a specified test force against the object this results in a force $F_1$ (FIG. 2) tending to force the plunger 11 to retract within the sleeve 13. The force $F_1$ is resisted by the rollers 35 retained in the groove 29 by the springs 37. The resistance to outward bending by the springs 37 is represented by the equal forces $F_2$. The force $F_3$ is the outward force against the plunger 11 exerted by the coiled compression spring 79. The force $F_3$ is made relatively small by the design of the spring 79.

When the pressure applied through the probe 27 against the test object is increased to the point where $F_1$ is large enough to cause outward bending of the springs 37 the rollers 35 will roll out of the groove 29 as the plunger 11 promptly retracts. During retraction of the plunger the rollers will roll on the smooth surface of the plunger with the Forces $F_2$ having no horizontal component except for a small rolling friction, to resist the force $F_1$.

The magnitude of the force $F_1$ required to cause retraction of the plunger 11 depends on the position of the ring 105 along the length of the longitudinal springs 37. As previously pointed out, when the cylindrical sections 87 and 91 are rotated and move longitudinally of the sleeve 13 due to the threaded engagement between the cylindrical section 87 and the sleeve 13 the ring 105 moves longitudinally of the springs 37 with the projections 107 of the spring contacting the springs 37. It is apparent that such movement of the ring 105 changes the effective length of the springs 37. As the effective length is made shorter the springs 37 in the region between the rollers 35 and the projections 107 become stiffer which increases the forces $F_2$. Thus the force $F_1$ required to roll the rollers out of the groove 29 also increases.

It is seen that the force $F_1$ required to retract the plunger 11 is quickly and easily adjusted by rotating the cylindrical sections 87 and 91 and thereby moving the ring 105 on the springs 37 to change the effective length of the springs. Scale markings 155 (FIG. 4) are provided on the sleeve 13 and dial markings 157 (FIG. 1) are provided at the tapered end of the rotatable cylindrical section 91. By calibration the dial settings made by rotating the cylindrical sections 87 and 91 are made to correspond to the various forces $F_1$ required to produce retraction of the plunger 11. The sections 87 and 91 may be locked at a particular setting by a set screw 161 (FIG. 4) in the handle 73.

The invention provides greatly increased assurance that the full force desired for a particular test will be applied but not exceeded either by error or inadvertance of the operator. The applied force quickly diminishes when the plunger 11 retracts. Upon retraction the plunger contacts the electric contact spring 121 and this causes the buzzer 145 to sound giving audible indication that the desired test force has been applied.

The rollers 35, being on opposite sides of the plunger 11, provide a self-centering effect on the plunger and results in friction and waring effects being applied symmetrically to the plunger and rollers. This arrangement helps to assure enduring consistency, i.e., exact repeatability, in the operation of the invention.

What is claimed is:

1. An adjustable force probe for applying an adjustable preset force against an object comprising:
   a plunger slidably disposed in a longitudinal sleeve;
   an irregularity on the surface of said plunger forming an indentation;
   a flexibly mounted detent element bearing against said indentation;
   angular contacting surfaces existing between said detent element and said indentation in the longitudinal direction of said plunger whereby a longitudinal force applied against said plunger in at least one direction will tend to force said detent element laterally and outwardly of said plunger and thus ride said detent element out of said indentation to permit sliding of said plunger in said sleeve;
   means for adjusting the mounting flexibility of said detent element to thereby adjust the amount of longitudinal force required against said plunger to ride said detent element out of said indentation and permit sliding of said plunger;
   said flexible mounting of said detent element comprising a metallic strip linked with said detent element and extending longitudinally of said plunger and said sleeve;
   said means for adjusting said mounting flexibility of said detent element comprising a contact portion bearing on said metallic strip, means for moving said contact portion longitudinally of said strip to thereby vary the effective length of said strip.

2. The invention as defined in claim 1 wherein said detent element comprises a roller.

3. The invention as defined in claim 2 wherein said contact portion comprises a ring encircling said sleeve and said plunger, said ring having a projection in contact with said metallic strip, said means for moving said contact portion longitudinally of said strip comprising a cylindrical section engaging said ring and surrounding and threadedly engaging said sleeve.

4. The invention as defined in claim 3 wherein said indentation comprises an annular groove extending around said plunger, a pair of said rollers fitted in said groove on diametrically opposite sides of said plunger, each of said rollers having one of said metallic strips linked thereto, said ring having a pair of said projections, one of said projections slidably contacting each of said strips.

5. The invention as defined in claim 4 wherein said annular groove comprises a pair of opposite conical surfaces, said rollers each comprising a pair of spaced circular portions having conical surfaces corresponding to and bearing against said conical surfaces of said groove, said spaced portions being joined by a circular shaft extending between said portions.

6. The invention as defined in claim 5 including a bearing element joined to each of said metallic strips and engaging one of said circular shafts, a circular recess in each of said bearing elements receiving one of said shafts.

7. The invention as defined in claim 4 wherein said sleeve comprises a pair of diametrically opposed slots, each of said rollers projecting into one of said slots, said sleeve having a pair of longitudinal grooves formed in the outer surface thereof and aligned with said slots, each of said metallic strips being disposed in one of said longitudinal grooves, each of said projections of said ring extending into one of said longitudinal grooves, said metallic strips being fixed to said sleeve at a portion thereof remote from said rollers.

8. The invention as defined in claim 4 including a stop at one end of said sleeve for limiting sliding of said plunger in the direction of said stop, a spring within said sleeve urging said plunger against said stop, said rollers being in said groove when said plunger is bearing against said stop.

9. The invention as defined in claim 8 including electrically energized means for audibly indicating sliding of said plunger away from said stop.

* * * * *